United States Patent
Lopez, III et al.

(10) Patent No.: US 12,090,513 B2
(45) Date of Patent: Sep. 17, 2024

(54) RETROREFLECTIVE SURFACE LAYERS

(71) Applicant: Lyft, Inc., San Francisco, CA (US)

(72) Inventors: Abel Lopez, III, Brooklyn, NY (US); Emerson Kelby Halbach, New York, NY (US); Jeffrey Alan Boyd, San Rafael, CA (US); Merric-Andrew Jaranowski French, San Francisco, CA (US); Rochus Emanuel Jacob, San Francisco, CA (US); Oliver Maximilian Mueller, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 997 days.

(21) Appl. No.: 16/836,196

(22) Filed: Mar. 31, 2020

(65) Prior Publication Data
US 2021/0299701 A1    Sep. 30, 2021

(51) Int. Cl.
*B05D 5/06* (2006.01)
*B05B 5/03* (2006.01)
(Continued)

(52) U.S. Cl.
CPC .............. *B05D 5/063* (2013.01); *B05B 5/032* (2013.01); *B05D 3/12* (2013.01); *B05D 7/536* (2013.01); *B62J 6/20* (2013.01)

(58) Field of Classification Search
CPC .... B05B 1/02; B05B 1/12; B05B 3/12; B05B 5/063; B05B 5/032; B05B 12/24;
(Continued)

(56) References Cited

U.S. PATENT DOCUMENTS

| 4,849,265 A | * | 7/1989 | Ueda | G02B 5/128 |
| | | | | 428/145 |
| 2008/0085402 A1 | * | 4/2008 | Leininger | B05D 5/068 |
| | | | | 428/200 |
| 2009/0110813 A1 | * | 4/2009 | Zimmerman | E01C 23/166 |
| | | | | 427/137 |

FOREIGN PATENT DOCUMENTS

EP    2261108 A2 * 12/2010    ............. B62H 5/145

OTHER PUBLICATIONS

Hericz et al., "Simulation of small—and wide-angle scattering properties of glass-bead retroreflectors", Applied Optics, May 10, 2017, vol. 56, No. 14, 9 pages, Budapest, Hungary.
(Continued)

*Primary Examiner* — Kevin Hurley
*Assistant Examiner* — Felicia L. Brittman-Alabi
(74) *Attorney, Agent, or Firm* — Baker Botts L.L.P.

(57) ABSTRACT

Techniques related to retroreflective surface layers for micro-mobility transit vehicles are disclosed. A retroreflective surface layer may be formed over at least a portion of a component of a micro-mobility transit vehicle by forming a powder coat layer over the portion of the component and baking the powder coat layer to cure the powder coat layer. An uncured clear coat layer may be formed over the powder coat layer. The uncured clear coat layer may be impregnated with a plurality of glass beads via an air-pressure applicator. The uncured clear coat layer impregnated with the glass beads may be baked to cure the clear coat layer. The retroreflective surface layer may include the powder coat layer, clear coat layer, and the plurality of glass beads distributed within the clear coat layer. The retroreflective surface layer may reflect incident light back to its source with minimal scattering of the light.

20 Claims, 16 Drawing Sheets

(51) Int. Cl.
*B05D 3/12* (2006.01)
*B05D 7/00* (2006.01)
*B62J 6/20* (2006.01)

(58) Field of Classification Search
CPC ..... B05B 7/536; B05B 7/1413; B05B 5/1683;
B05B 2420/01; B05B 2601/20; B62J 6/20
USPC ........................................................ 280/202
See application file for complete search history.

(56) References Cited

OTHER PUBLICATIONS

Carlos A. Lopez, "Section 4: Inspection during Application", Manual Notice:2004-1, Pavement Marking Handbook, Aug. 1, 2004, Retrieved on Internet: http://onlinemanuals.txdot.gov/txdotmanuals/pmh/inspection during application.htm, 9 pages.

Crafco Inc. Preservation Products, Beads—Megalux (Airport) FAA Type IV-B, Retrieved on Internet: https://shopcrafco.com/products/beads-faa-type-4b, 2 pages.

Carlos A. Lopez, "Section 5: Glass Beads", Manual Notice:2004-1, Pavement Marking Handbook, Aug. 1, 2004, Retrieved on Internet: <http://onlinemanuals.txdot.gov/txdotmanuals/pmh/glass_beads.htm>, 4 pages.

\* cited by examiner

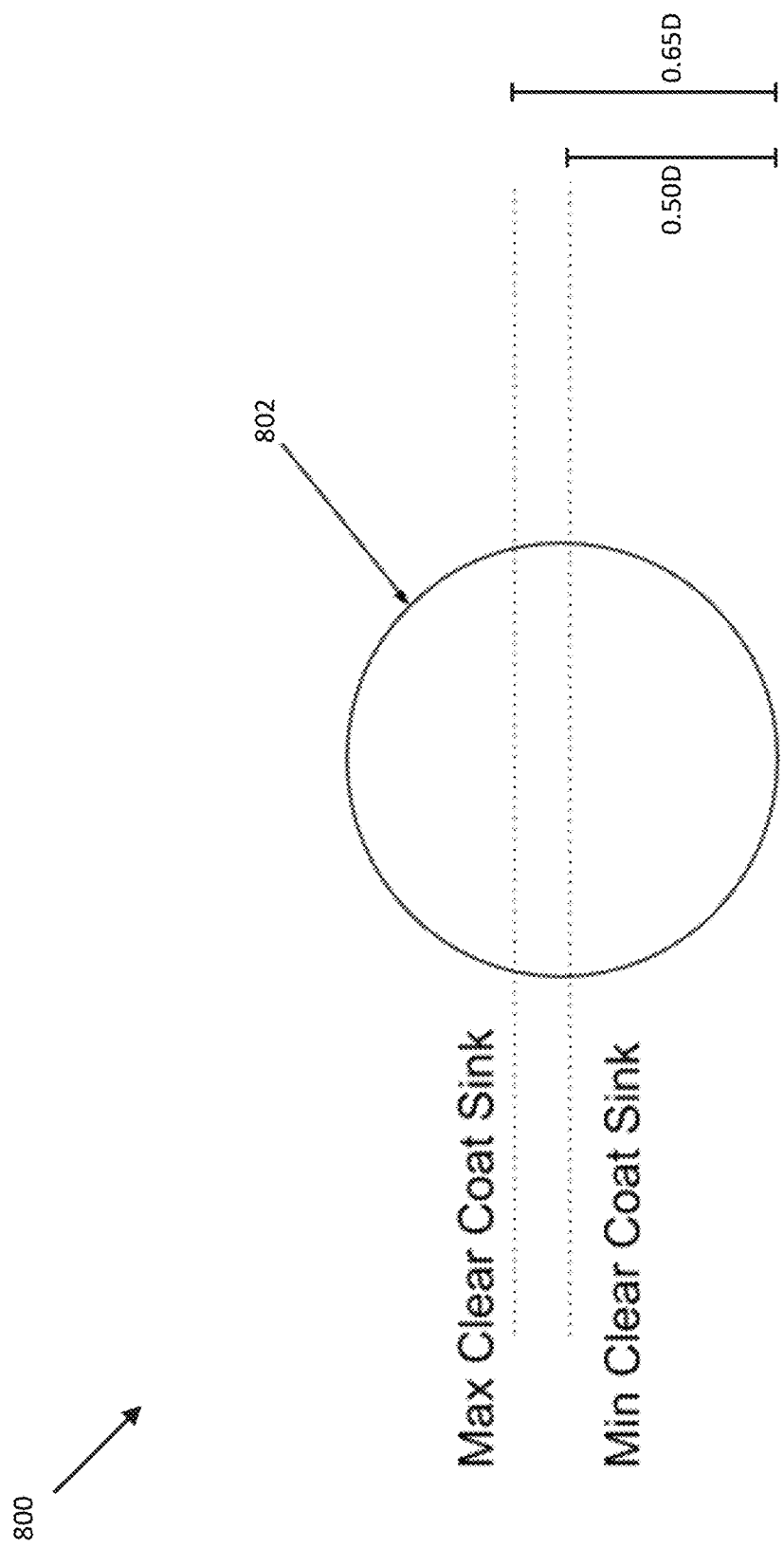

900
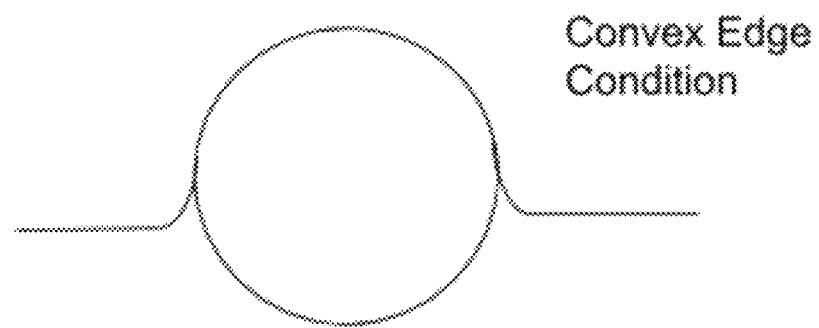
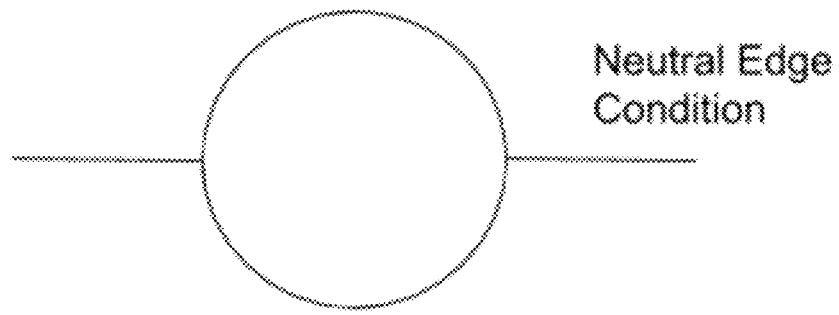
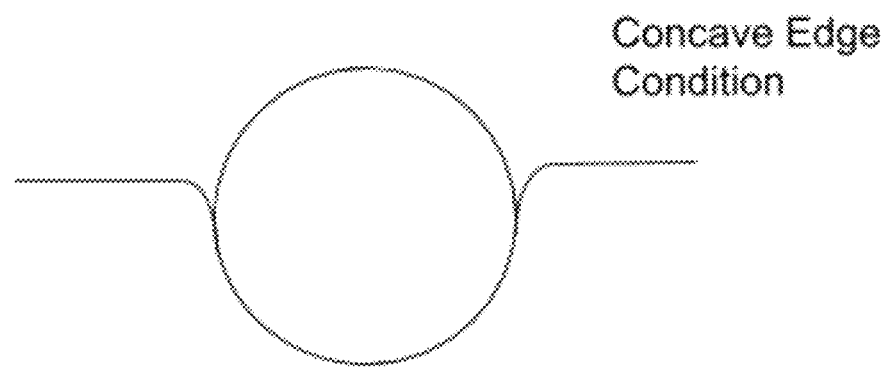
Fig. 9

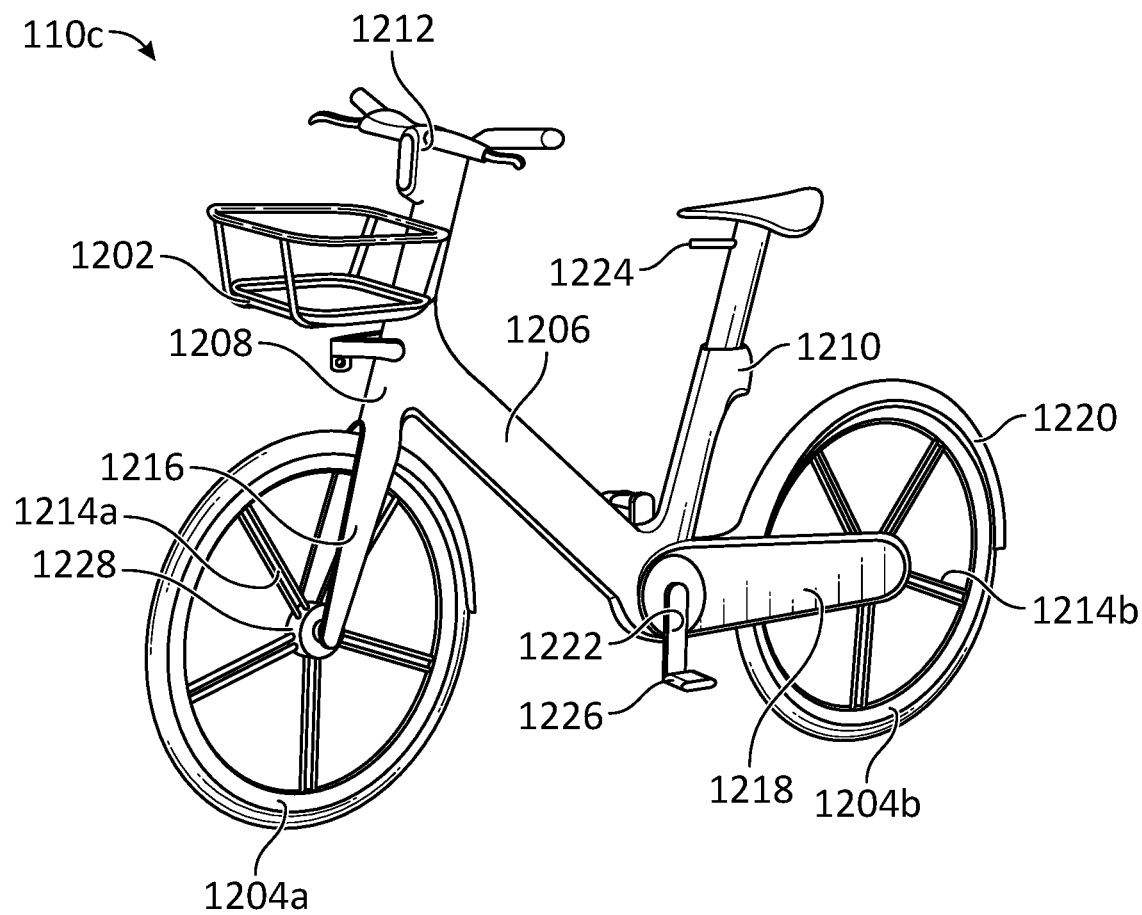
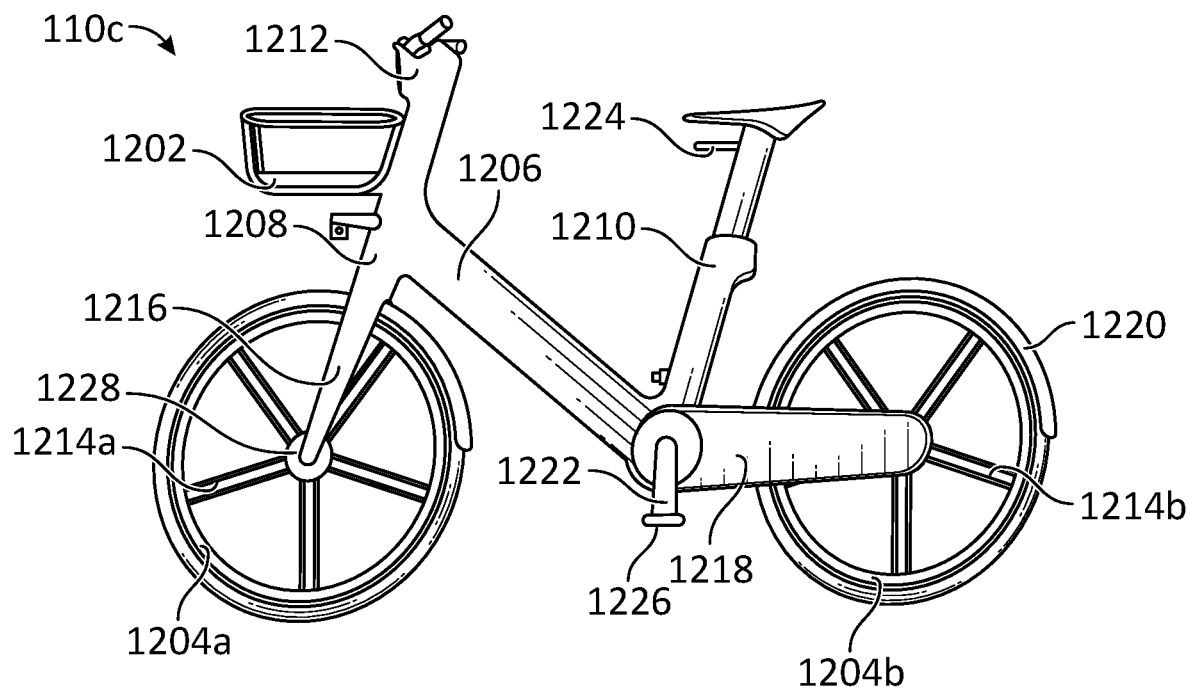
FIG. 12

RETROREFLECTIVE SURFACE LAYERS

TECHNICAL FIELD

One or more embodiments of the present disclosure relate generally to reflective coatings and more particularly, for example, to retroreflective surface layer techniques for micro-mobility transit vehicles.

BACKGROUND

Contemporary transportation services may incorporate a variety of different types of vehicles, including motorized or electric kick scooters, bicycles, and seated scooters generally designed to transport one or two people at once. Collectively such vehicles may be referred to as micro-mobility transit vehicles. Surface coatings applied to the micro-mobility transit vehicles may be used to identify such vehicles and provide a defense against the environment and other external factors.

SUMMARY

Techniques related to retroreflective surface layers for micro-mobility transit vehicles are disclosed. In an example embodiment, a method for forming a retroreflective surface layer over at least a portion of a component of a micro-mobility transit vehicle includes forming a powder coat layer over the portion of the component and baking the powder coat layer to cure the powder coat layer. The method may further include forming an uncured clear coat layer over the powder coat layer. The uncured clear coat layer may be impregnated with a plurality of glass beads via an air-pressure applicator. The uncured clear coat layer impregnated with the glass beads may be baked to cure the clear coat layer. The retroreflective surface layer may include the powder coat layer, clear coat layer, and the plurality of glass beads distributed within the clear coat layer.

In another example embodiment, a component of a micro-mobility transit vehicle is disclosed where the component has a retroreflective surface layer including a cured powder coat layer formed over at least a portion of the component, and a cured clear coat layer formed over the cured power coat layer, where the cured clear coat layer comprises a plurality of glass beads distributed therein.

In another example embodiment, a micro-mobility transit vehicle that includes a component having a retroreflective surface layer is disclosed. The micro-mobility transit vehicle may be a sit-scooter, a stand-scooter, or a bicycle for example. The component may be a basket, a frame, a wheel, a front tube, a handlebar, a seat support, or a taillight assembly for example.

A micro-mobility transit vehicle assembled with various components having the retroreflective surface layer may increase visibility of the micro-mobility transit vehicle as the retroreflective surface layers will reflect incident light back to its source with minimal scattering of the light.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 8 illustrates a diagram of example maximum and minimum bead depths to achieve a particular retroreflective characteristic of a retroreflective surface layer in accordance with embodiments of the disclosure.

FIG. 9 illustrates diagrams of example edge conditions of beads embedded in a clear coat layer in accordance with embodiments of the disclosure.

FIG. 12 illustrates diagrams of a micro-mobility transit vehicle having a retroreflective surface layer on various components in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
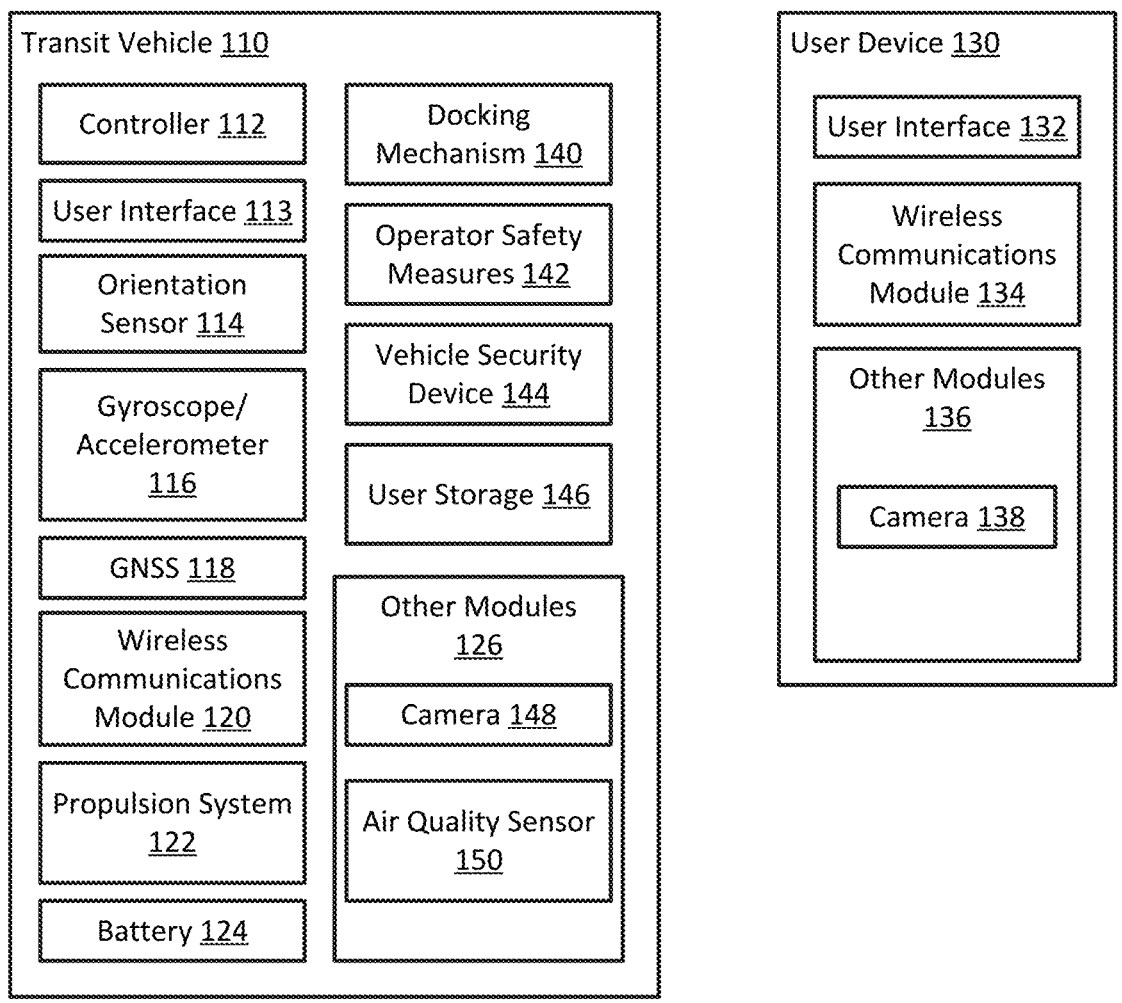
FIG. 1 illustrates a block diagram of a portion of a dynamic transportation matching system including a transit vehicle in accordance with embodiments of the disclosure.

In accordance with various embodiments of the present disclosure, a retroreflective surface layer may be applied to various components of micro-mobility transit vehicles (e.g., electric kick scooters, bicycles, motor scooters, and/or other vehicles generally designed to transport one or two people at once) such that the retroreflective surface layer may reflect incident light back to its source with minimal scattering of the light. For example, in low-light conditions such as during a night time, light directed to the retroreflective surfaces of the micro-mobility transit vehicle may be reflected back to its source allowing the source to easily identify the micro-mobility transit vehicle.

According to various embodiments, a retroreflective surface layer may be formed over at least a portion of a component of a micro-mobility transit vehicle. A method for forming the retroreflective surface layer may include forming a powder coat layer over the portion of the component (e.g., clean and non-masked portion). For example, the powder coat layer may be formed by applying, via an electrostatic applicator, a powder coat powder to the component. The powder coat powder and the component may be baked in an oven at approximately between 185-195 degrees Celsius for approximately 20 minutes.

An acrylic clear coat layer may be applied to the cured powder coat layer using a wet applicator (e.g., spray gun) to form an uncured clear coat layer having a thickness of approximately 25-50 microns according to some embodiments. Before the clear coat is fully cured (e.g., within 5 minutes of application and before forced thermal curing), glass beads may be propelled with a pressure gun into the clear coat layer such that a significant portion of the glass beads are embedded within the clear coat layer at a selected depth. A depth of 0.5 to 0.65 times the diameter of a glass bead may provide a maximum retroreflectivity as well as sustained reliability during prolonged exposure to environmental elements or other external factors. Various retroreflective characteristics of the coating may be adjusted by controlling the depth of the glass beads in the clear coat. The depth may be controlled by (1) applying a certain air pressure to the pressure gun, (2) timing between application of the clear coat and deposition of the glass beads, (3) viscosity of the clear coat, and (4) environmental conditions during application of the clear coat and deposition of the glass beads (e.g., humidity, temperature, pollutants, particles, contaminants). After glass bead impregnation, the coating may be cured by heating within an oven for approximately 20 minutes at between 100-110 degrees Celsius.

Embodiments of a retroreflective surface layer may include the powder coat layer applied to the prepared surface of the component (e.g. metal substrate), the clear coat layer applied to the powder coat layer, and the glass beads embedded into the clear coat layer, where characteristics of the powder coat, clear coat, and glass beads combine to provide retroreflective characteristics for the retroreflective surface layer. A micro-mobility transit vehicle assembled with various components having the retroreflective surface layer may increase visibility of the micro-mobility transit vehicle as the retroreflective surface layers will reflect incident light back to its source with minimal scattering of the light. The retroreflective surface layers applied to various components may also provide visual marks to help riders and others identify the micro-mobility transit vehicle (e.g., brand awareness).

FIG. 1 illustrates a block diagram of a portion of a dynamic transportation matching system (e.g., system 100) including a transit vehicle 110 in accordance with an embodiment of the disclosure. In the embodiment shown in FIG. 1, system 100 includes transit vehicle 110 and user device 130. In general, transit vehicle 110 may be a passenger vehicle designed to transport a single user (e.g., a micro-mobility transit vehicle) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micro-mobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a manager/servicer providing transit vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory or data storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 123 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of transit vehicle 110 and/or system 100. In further embodiments, other modules 126 may include a light, such as a headlight or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility transit vehicle, as described herein.

Transit vehicles implemented as micro-mobility transit vehicles may include a variety of additional features designed to facilitate transit management and user and environmental safety. For example, as shown in FIG. 1, transit vehicle 110 may include one or more of docking mechanism 140, operator safety measures 142, vehicle security device 144, and/or user storage 146, as described in more detail herein.

In particular, in some embodiments, operator safety measures 142 may be implemented as one or more of a headlight, a taillight, ambient lighting, a programmable lighting element (e.g., a multi-color panel, strip, or array of individual light elements, such as addressable light emitting diodes (LEDs), recessed and/or directional lighting, actuated lighting (e.g., articulated lighting coupled to an actuator), and/or other lighting coupled to and/or associated with transit vehicle 110 and controlled by controller 112. In other embodiments, operator safety measures 142 may include a speaker or other audio element configured to generate an audible alarm or sound to warn a rider or passersby of a detected safety concern, for example, or to inform a rider of a potential safety concern. More generally, operator safety measures 142 may be any electronic, mechanical, or electromechanical device or subsystem configured to increase the safety of a rider and/or mitigate potential harm to a rider under nominal operating conditions.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory or data storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
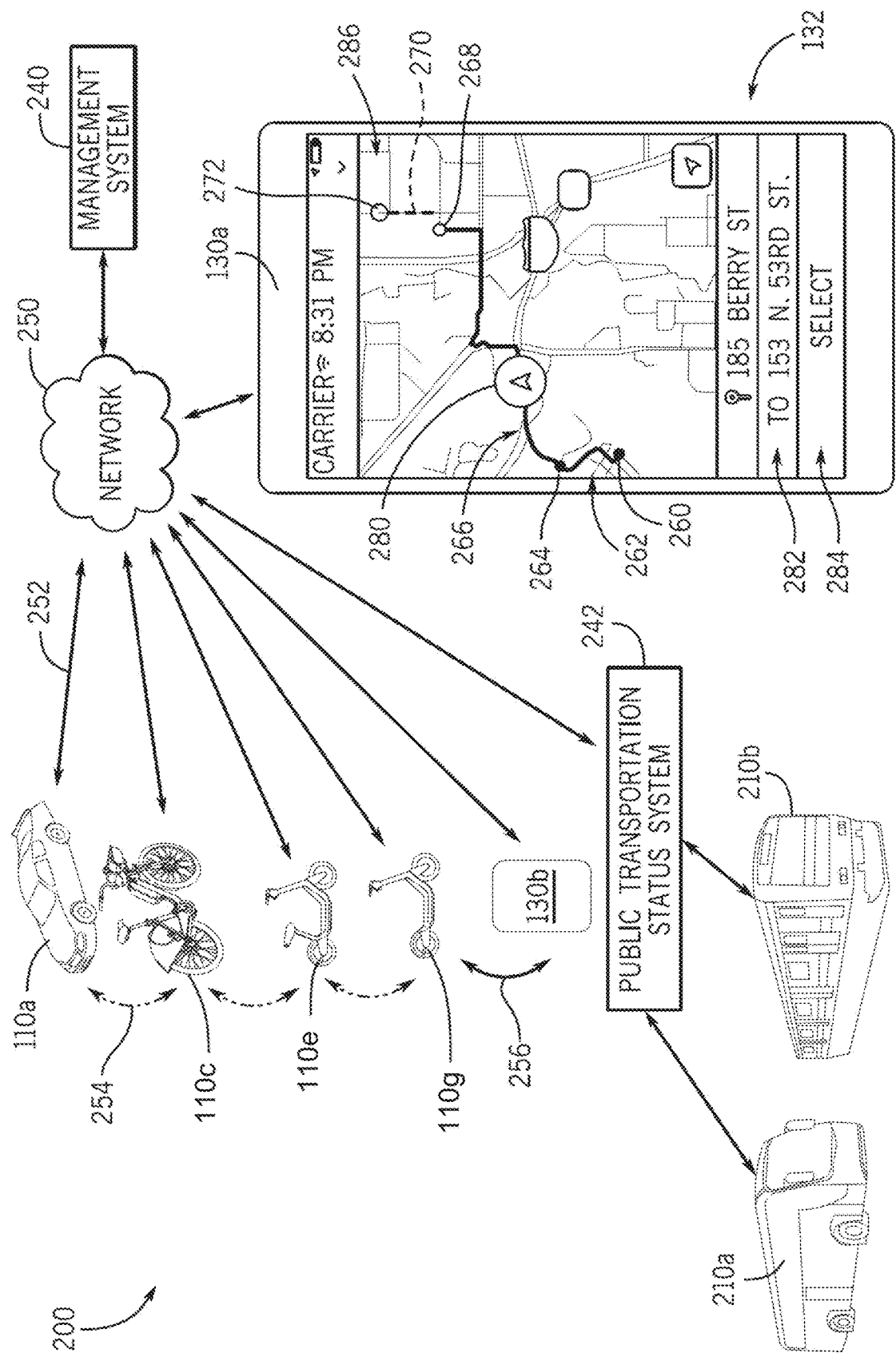
FIG. 2 illustrates a block diagram of a dynamic transportation matching system incorporating a variety of transportation modalities in accordance with embodiments of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110*a*, 110*c*, 110*e*, 110*g* and user devices 130*a-b* over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210*a*, trains 210*b*, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, a requestor may use user device 130*a* to receive an input with a request for transportation with one or more transit vehicles 110*a*, 110*c*, 110*e*, 110*g* and/or public transportation vehicles 210*a-b*. For example, the transportation request may be a request to reserve one of transit vehicles 110*a*, 110*c*, 110*e*, 110*g*. The transportation request may be transmitted to management system 240 over WAN 250, allowing management system 240 to poll status of transit vehicles 110*a*, 110*c*, 110*e*, and 110*g* to select one of transit vehicles 110*a*, 110*c*, 110*e*, and 110*g* to fulfill the transportation request; receiving a fulfillment notice from management system 240 and/or from the selected transit vehicle, and receiving navigation instructions to proceed to or otherwise meet with the selected transit vehicle. A similar process may occur using user device 130*b*, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110*a*, 110*c*, 110*e*, and 110*g*, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110*a*, 110*c*, 110*e*, and 110*g*, as described herein.

User device 130*a* in FIG. 2 includes a display of user interface 132 that shows a planned route for a user attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210*a* or 210*b*), and a micromobility route 270 (e.g., using one or more of micromobility transit vehicles 110*c*, 110*e*, and 110*g*) from bus stop 268 to destination 272. Also shown rendered by user interface 132 are a present location indicator 280 (indicating a present absolute position of user device 130*a* on street map 286), a navigation destination selector/indicator 282 (e.g., configured to allow a user to input a desired navigation destination), and a notice window 284 (e.g., used to render vehicle status data or other information, including user notices and/or alerts, as described herein). For example, a user may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a user (e.g., initially and/or while traversing a particular planned route), and a user may select or make changes to such a route through manipulation of user device 130*a*, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share transit vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
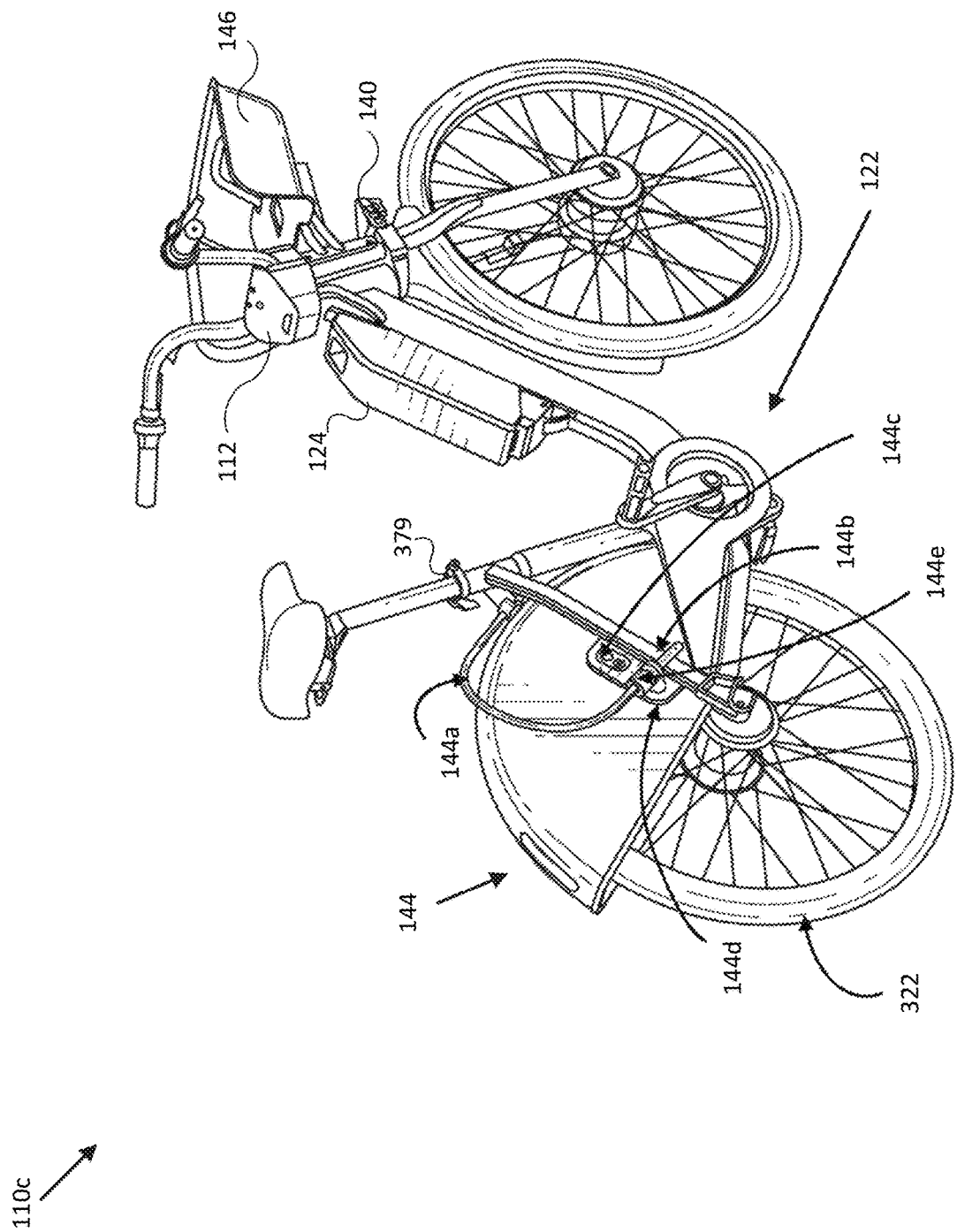
FIGS. 3A-D illustrate diagrams of micro-mobility transit vehicles for use in a dynamic transportation matching system in accordance with embodiments of the disclosure.
Figure 3B:
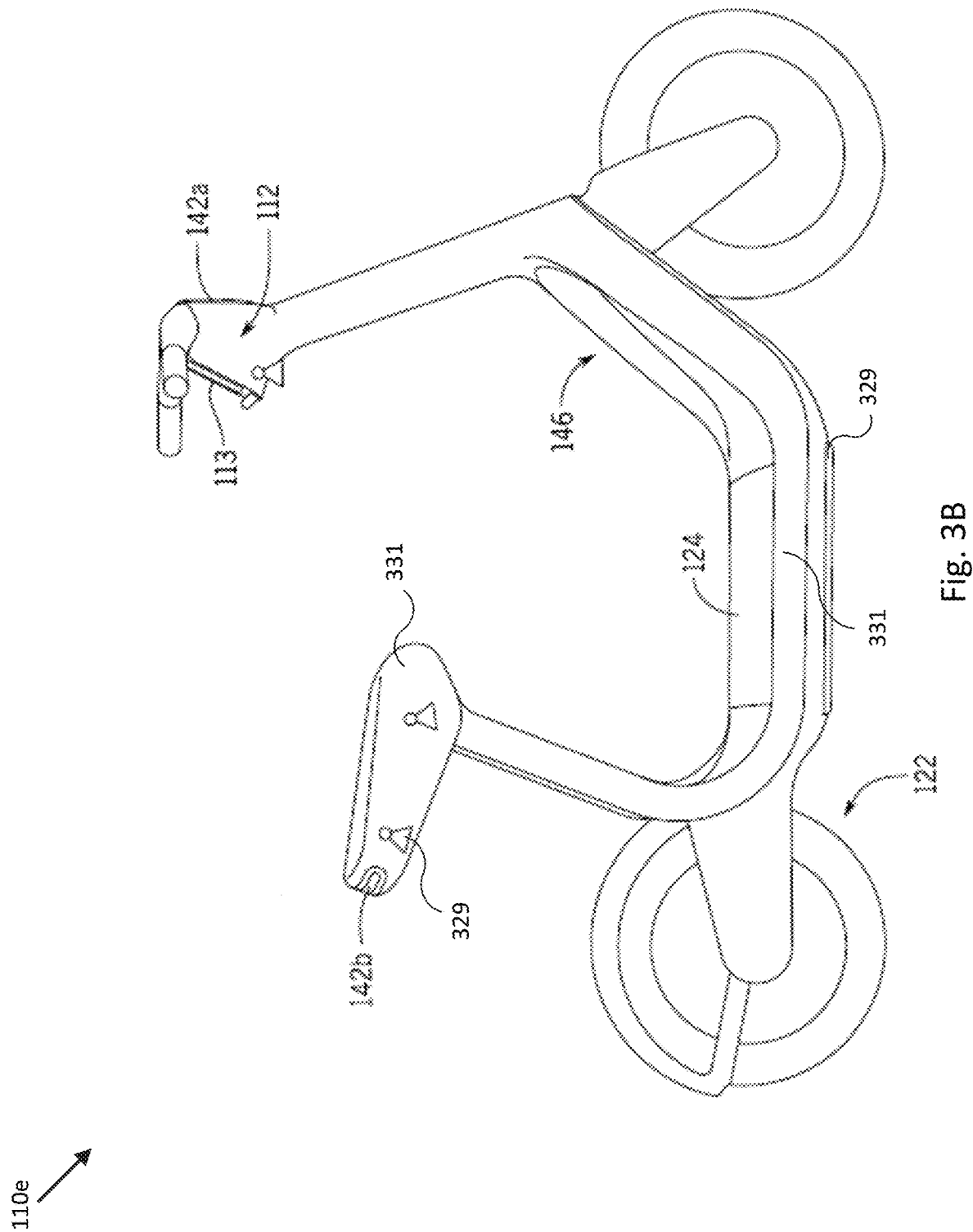
Figure 3C:
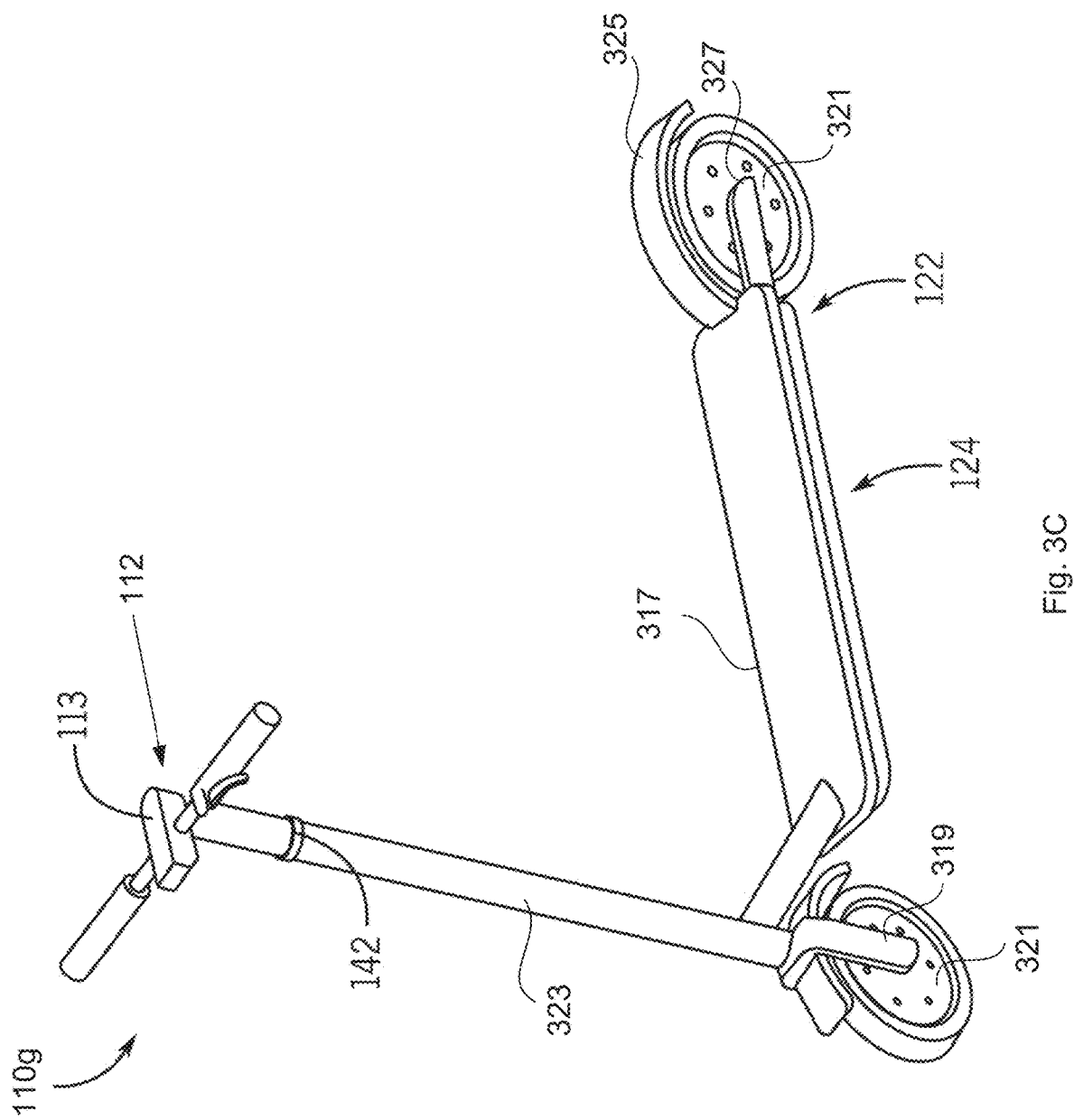

FIGS. 3A-C illustrate diagrams of micro-mobility transit vehicles 110*c*, 110*e*, and 110*g*, which may be integrated with mobile mesh network provisioning systems in accordance with an embodiment of the disclosure. For example, transit vehicle 110*c* of FIG. 3A may correspond to a motorized bicycle that is integrated with the various elements of system 100 and may be configured to participate in dynamic transportation matching system 200 of FIG. 2. As shown, transit vehicle 110*c* includes controller/user interface/wireless communications module 112/113/120 (e.g., integrated with a rear fender of transit vehicle 110*c*), propulsion system 122 configured to provide motive power to at least one of the wheels (e.g., a rear wheel 322) of transit vehicle 110*c*, battery 124 for powering propulsion system 122 and/or other elements of transit vehicle 110*c*, docking mechanism 140 (e.g., a spade lock assembly) for docking transit vehicle 110*c* at a docking station, user storage 146 implemented as a handlebar basket, and vehicle security device (e.g., an embodiment of vehicle security device 144 of FIG. 1), which may incorporate one or more of a locking cable 144*a*, a pin 144*b* coupled to a free end of locking cable 144*a*, a pin latch/insertion point 144*c*, a frame mount 144*d*, and a cable/pin holster 144*e*, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilizing rear wheel 322 of transit vehicle 110*c*, such as by engaging pin 144*b* with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144*c*. In various embodiments, vehicle security device 144 may be configured to immobilize transit vehicle 110*c* by default, thereby requiring a user to transmit a request to management system 240 (e.g., via user device 130) to reserve transit vehicle 110*c* before attempting to use transit vehicle 110c. The request may identify transit vehicle 110c based on an identifier (e.g., a QR code, a barcode, a serial number, etc.) presented on transit vehicle 110c (e.g., such as by user interface 113 on a rear fender of transit vehicle 110c). Once the request is approved (e.g., payment is processed), management system 240 may transmit an unlock signal to transit vehicle 110c (e.g., via network 250). Upon receiving the unlock signal, transit vehicle 110c (e.g., controller 112 of transit vehicle 110c) may release vehicle security device 144 and unlock rear wheel 322 of transit vehicle 110c.

Additionally, as shown in FIG. 3A, transit vehicle 110c may include a seat post clamp assembly 379 configured to adjust between an open and closed position such that a seat post extending from a seat post tube of the frame of transit vehicle 110c may be adjusted in height and securely locked into position as described herein.

Transit vehicle 110e of FIG. 3B may correspond to a motorized sit-scooter that is integrated with the various elements of system 100 and may be configured to participate in dynamic transportation matching system 200 of FIG. 2. As shown in FIG. 3B, transit vehicle 110e includes many of the same elements as those discussed with respect to transit vehicle 110c of FIG. 3A. For example, transit vehicle 110e may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlight assemblies, taillight assemblies, programmable light elements/strips/spotlights, and/or reflective strips, as described herein. As shown in FIG. 3B, transit vehicle 110e may also be implemented with various other vehicle light assemblies (e.g., light assemblies 329 disposed within a seat 331, the cockpit enclosure 112, and a deck 331) to increase visibility, to provide ambient lighting, and/or to provide lighted beaconing, as described herein.

Transit vehicle 110g of FIG. 3C may correspond to a motorized stand or kick scooter that is integrated with the various elements of system 100 and may be configured to participate in dynamic transportation matching system 200 of FIG. 2. As shown in FIG. 3C, transit vehicle 110g includes many of the same elements as those discussed with respect to transit vehicle 110c of FIG. 3A. For example, transit vehicle 110g may include user interface 113, propulsion system 122, battery 124, controller/wireless communications module/cockpit enclosure 112/120/312, and operator safety measures 142, which may be implemented as various types of programmable light strips and/or reflective strips, as shown. Transit vehicle 110g may further include a deck 317, fork 319, wheel rims/spokes 321, bars 323, rear wheel stay 327 and fender 325. Deck 317 may provide a floorboard surface for rider to stand on. Fork 319 may hold a front wheel of transit vehicle 110g while rear wheel stay 327 may hold a back wheel. According to some embodiments, one or more combinations of the above components (or portions of the components) of transit vehicle 110g may be selected to be coated with a retroreflective surface layer disclosed herein.

Figure 3D:
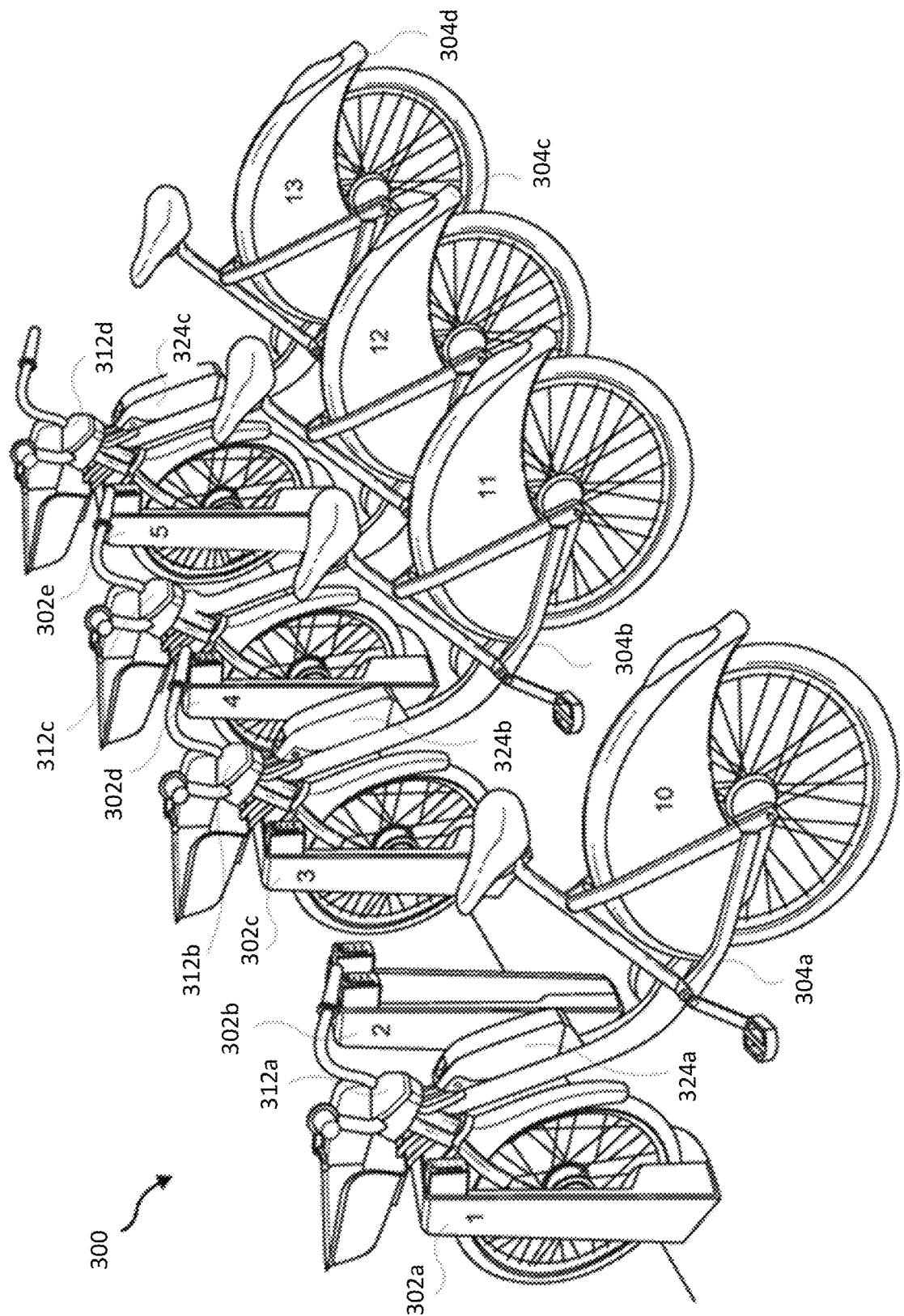

FIG. 3D illustrates a docking station 300 for docking transit vehicles (e.g., transit vehicles 110c, 110e, and 110g, etc.) in accordance with embodiments of the disclosure. As shown in FIG. 3D, docking station 300 may include multiple bicycle docks, such as docks 302a-e. For example, a single transit vehicle (e.g., any one of electric bicycles 304a-d) may dock in each of docks 302a-e of docking station 300. Each of docks 302a-e may include a lock mechanism for receiving and locking docking mechanism 140 of electric bicycles 304a-d. In some embodiments, once a transit vehicle is docked in a bicycle dock, the dock may be electronically and/or communicatively coupled to the transit vehicle (e.g., to controllers and/or wireless communications modules integrated within cockpit enclosures 312a-d of transit vehicles 304a-d) via a communication link such that the transit vehicle may be charged by the dock and the transit vehicle and the dock may communicate with each other via the communication link (e.g., similar to communications over mobile mesh network 260), as described herein.

For example, a requestor may use user device 130a to reserve a transit vehicle docked to one of bicycle docks 302a-e by transmitting a reservation request to management system 240. Once the reservation request is processed, management system 240 may transmit an unlock signal to a docked transit vehicle and/or one of docks 302a-e via network 250 and/or mobile mesh network 260. One of docks 302a-e may automatically unlock an associated lock mechanism to release the transit vehicle based, at least in part, on such unlock signal. In some embodiments, each of docks 302a-e may be configured to charge batteries (e.g., batteries 324a-c) of electric bicycles 304a-d while electric bicycles 304a-d are docked at docks 302a-e. In some embodiments, docking station 300 may also be configured to transmit status information associated with docking station 300 (e.g., a number of transit vehicles docked at docking station 300, charge statuses of docked transit vehicles, and/or other fleet status information) to management system 240.

In various embodiments, each of micro-mobility transit vehicles 110c, 110e, and 110g may be implemented with a subframe assembly configured to receive a modular battery assembly configured to power each one of micro-mobility transit vehicles 110c, 110e, and 110g. As described herein, such modular battery assembly may include various features designed to ease battery replacement, reduce overall vehicle weight, and provide additional service burden-reducing functionality configured to help form a reliable and robust propulsion system and/or propulsion control system for micro-mobility transit vehicles.

Figure 4:
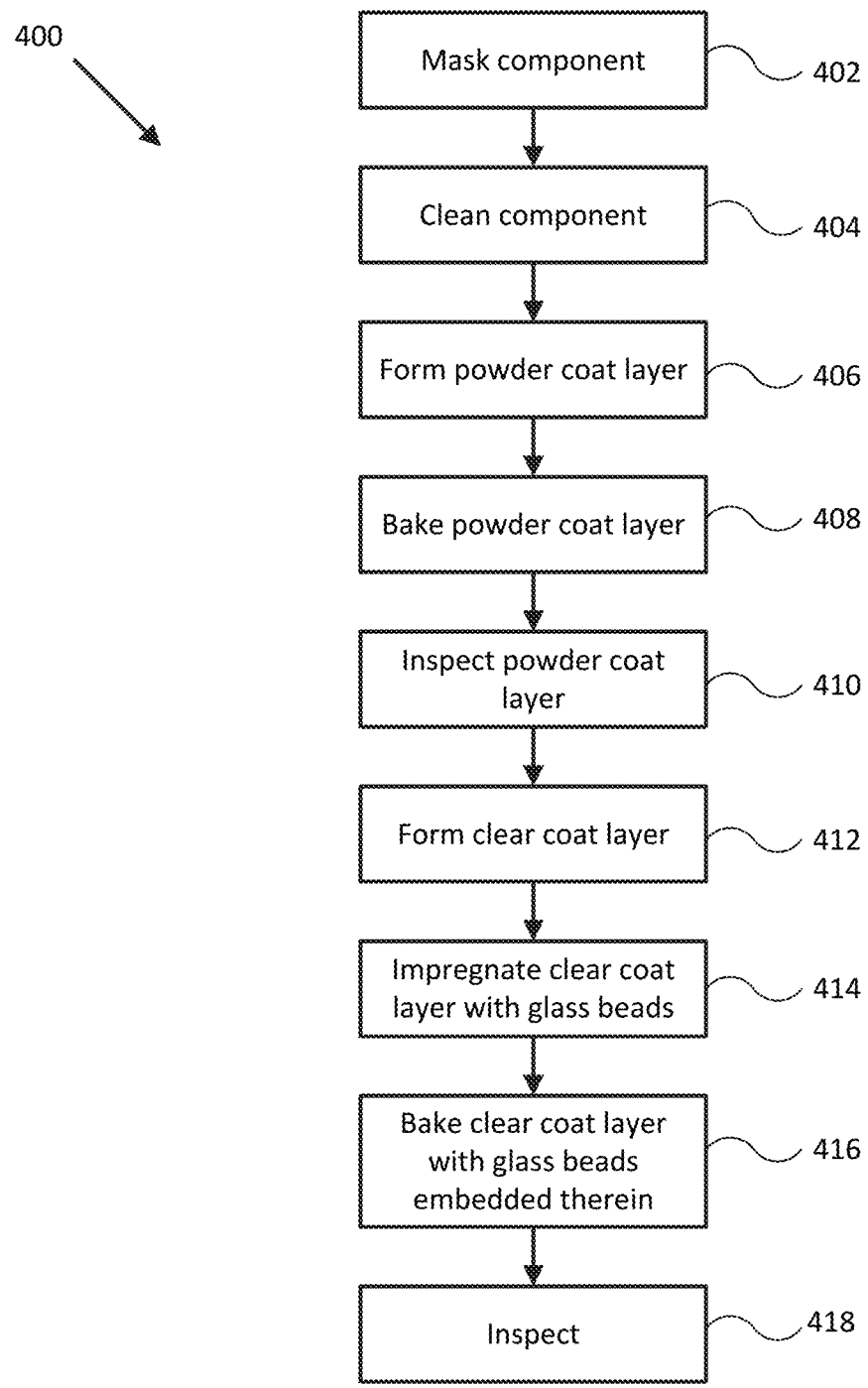
FIG. 4 illustrates a flow diagram of a process to form a retroreflective surface layer over a component of a micro-mobility transit vehicle in accordance with embodiments of the disclosure.

FIG. 4 illustrates a flow diagram of a process 400 for forming a retroreflective surface layer over at least a portion of a component for a micro-mobility transit vehicle in accordance with an embodiment of the disclosure. It should be appreciated that any step, sub-step, sub-process, or block of process 400 may be performed in an order or arrangement different from the embodiments illustrated by FIG. 4. For example, in other embodiments, one or more blocks may be omitted from or added to the process. For illustrative purposes, process 400 is described in reference to FIGS. 5-10 but the following description of process 400 may generally be applied to the additional figures disclosed herein. Although reference is made herein to a single component of a micro-mobility transit vehicle, it will be appreciated that any step, sub-step, sub-process, etc. of process 400 may be applied to more than one component throughout process 400.

At block 402 of process 400, a component of a micro-mobility transit vehicle may be masked. For example, at least a perimeter of a portion or portions of the component that will not receive a retroreflective surface layer may be masked (e.g., by masking tape) to limit an extent of the retroreflective surface layer to the portion of the component. For example, portions of the component that may be masked include internal threads, holes, fasteners, and other functional surfaces that should not be coated.

In some embodiments, prior to masking, the components may be inspected to verify that all surface finishes are in accordance with acceptable standards (e.g., no scratches, gouges, marks, burrs, or foreign matter on the component). After the masking, exposed portions of the component may be cleaned at block 404. For example, a terry cloth or similar fabric may be used to clean the exposed portions in preparation for the next steps in process 400.

At block 406 of process 400, a powder coat layer may be formed over at least the unmasked portion of the component. In some embodiments, forming the powder coat layer may include applying, via an electrostatic applicator, a powder coat powder to the component and baking (e.g., heating) the powdered component to cure the powder coat powder and form a cured powder coat layer. The component may have a metal substrate to which the powder coat powder may be electrostatically applied. For example, the metal substrate may be aluminum 6061 T6 in some cases. The powder coat powder may be applied in flat passes on every surface of the portion of the component in some implementations.

At block 408 of process 400, the powdered component may be baked. In some embodiments, the powdered component may be baked by heating the powdered component in an enclosed oven for approximately 20 minutes at between 185-195 degrees Celsius. After baking the powdered component, the powdered component may be inspected at block 410 to verify that the powder coat layer has cured and is evenly coated.

At block 412 of process 400, a clear coat layer may be formed over the portion of the component. The clear coat layer may be formed by applying a clear coat to the component using a wet applicator. In some embodiments, the clear coat layer may be applied in a separate booth than a booth in which the powder coat layer is applied.

In some embodiments, the clear coat layer may be formed over the cured powder coat layer. In other embodiments, the powder coat layer may be omitted and the clear coat layer may be formed directly to the unmasked portion of the component.

In some cases, the uncured cleat coat layer comprises an acrylic clear coat material configured to form a matte finish when cured. In some cases, a wet application thickness of the uncured clear coat layer is selected such that a cured clear coat layer has a thickness of approximately between 25-50 microns.

At block 414 of process 400, the uncured clear coat layer of block 412 may be impregnated with a plurality of glass beads via an air-pressure applicator. In some embodiments, impregnation with the plurality of glass beads may be performed in a separate booth than booths in which the powder coat layer is applied and in which the clear coat layer is applied.

Figure 5:
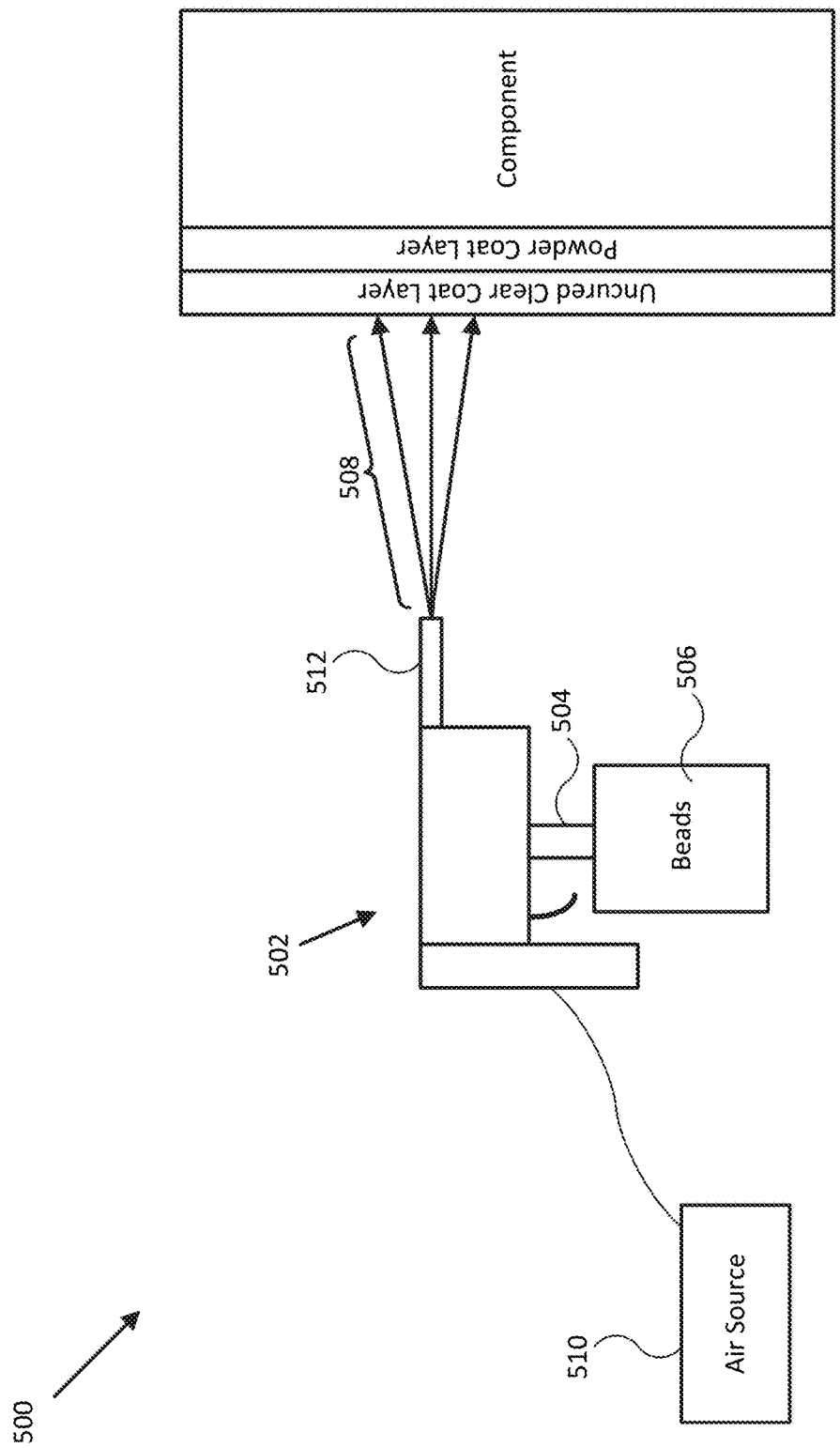
FIG. 5 illustrates an example block diagram for using an air-pressure applicator to impregnate an uncured clear coat layer with beads in accordance with embodiments of the disclosure.
Figure 6:
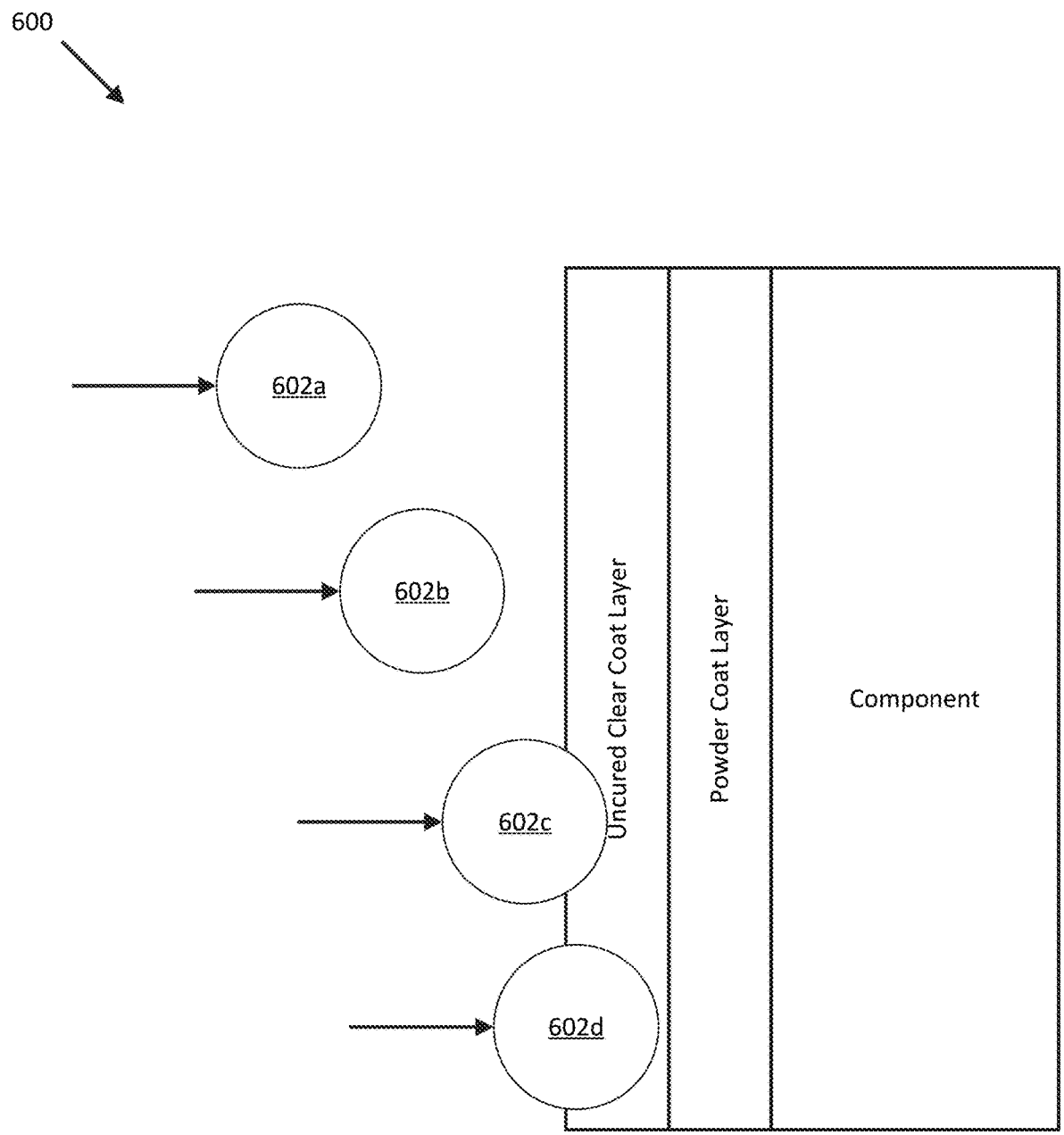
FIG. 6 illustrates an impregnation of an uncured clear coat layer with beads in accordance with embodiments of the disclosure.

As shown in the example embodiment 500 of FIG. 5, the air-pressure applicator 502 may include a siphon feed 504 (and/or a gravity fed glass bead reservoir) configured to supply the plurality of glass beads 506 to an air jet 508 ejected by the air-pressure applicator towards the portion of the component. In various embodiments, an ejection nozzle 512 of the air-pressure applicator 502 may have an ejection orifice diameter of at least approximately 1 millimeter. In an embodiment, the air-pressure applicator 502 may be configured to receive air 510 supplied at a pressure of approximately 45-60 pounds per square inch and generate the air jet 508 configured to embed at least a portion of the plurality of glass beads 506 approximately half their diameter within the uncured clear coat layer.

According to some embodiments, the uncured clear coat layer may be impregnated with the plurality of glass beads 506 within approximately 5 minutes of forming the uncured clear coat layer. As such, the uncured clear coat layer may have a viscosity that permits the glass beads to be embedded therein. For example, as shown in the embodiment 600 of FIG. 6, the glass beads 602a-d may be propelled with adequate pressure to sink to a controlled depth within the clear coat.

In an implementation, the uncured clear coat layer may be impregnated with the glass beads using one even spray pass in a zig-zag pattern with no overlaps. In other implementations, overlaps in spray may be utilized to achieve a desired bead density in the clear coat layer. In some embodiments, the volume of the plurality of glass beads 506 may be no more than 25% open during spraying. In one or more embodiments, the air-pressure applicator may be oriented substantially horizontally (e.g., perpendicular to a force of gravity) when propelling the glass beads into the clear coat layer. As such, a depth at which the glass beads are embedded into the clear coat layer may be controlled. However, in other embodiments, a vertical orientation (or orientations between horizontal and vertical) may be utilized to suit a desired implementation.

In various embodiments, the glass beads may be embedded to provide a smooth surface finish of glass beads that are at a suitable depth in the clear coat to balance reliability (e.g., resistance to environmental degradation) and reflectiveness.

Figure 7D:
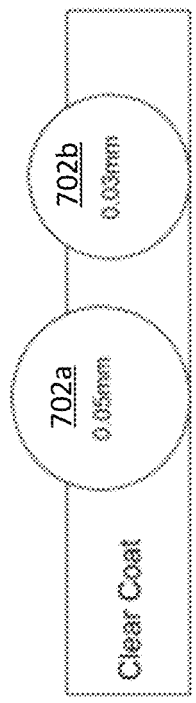
FIGS. 7A-E illustrate diagrams of various clear coat thicknesses and bead depths in accordance with embodiments of the disclosure.
Figure 7E:
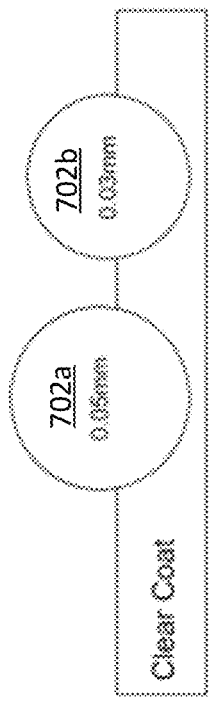
Figure 7A:
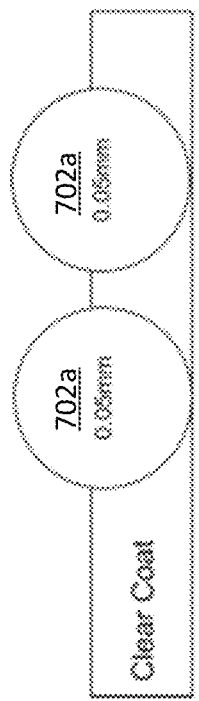
Figure 7B:
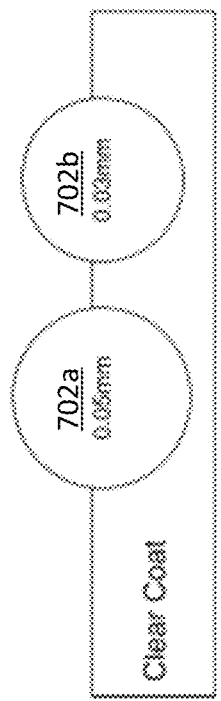
Figure 7C:
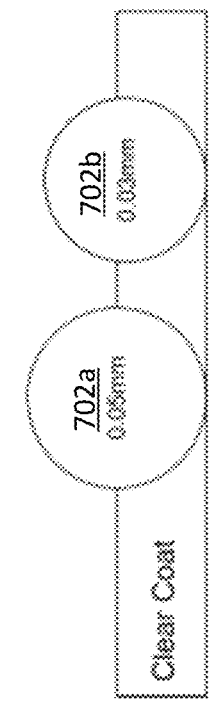

According to some embodiments, the plurality of glass beads may be uniform in size. In other embodiments, the glass beads may range approximately between 0.03 mm and 0.05 mm (e.g., 30 to 50 microns). FIG. 7A shows an example of a clear coat layer having a thickness of 25 microns in which glass beads 702a having no variation in diameter are embedded. FIG. 7B shows an example of a clear coat layer having a thickness of approximately between 25-50 microns in which glass beads 702a and 702b having a variation in diameter are embedded at an acceptable depth. FIG. 7C shows an example of a clear coat layer having a thickness of approximately between 10-25 microns in which glass beads 702a and 702b having a variation in diameter are embedded at an acceptable depth. FIG. 7D shows an example of a clear coat layer having a thickness of approximately between 25-50 microns in which glass beads 702a and 702b having a variation in diameter are embedded at an unacceptable depth. FIG. 7E shows an example of a clear coat layer having a thickness of approximately between 10-25 microns in which glass beads 702a and 702b having a variation in diameter are embedded at an unacceptable depth.

As illustrated in an example 800 in FIG. 8, each glass bead, regardless of variation in size or clear coat thickness, may be embedded at least up to the hemisphere or at a depth of one-half the diameter (e.g., 0.5 times diameter) of the glass bead according to some embodiments. A maximum depth may be 0.65 times the diameter of the glass bead in some embodiments. A controlled depth may provide for reliability against environmental degradation.

In various embodiments, viscosity of the clear coat may be controlled by environmental conditions during application of the clear coat (e.g., humidity, temperature, pollutants, particles, contaminants). In an implementation, care may be taken when controlling the viscosity of the clear coat such that it does not result in a convex edge condition or concave edge condition but rather a neutral edge condition as shown in the examples 900 of FIG. 9. As such, unfavorable refraction characteristics around glass beads may be eliminated. However, in various other implementations, convex and concave edge conditions may be used to suit desired application.

Figure 10:
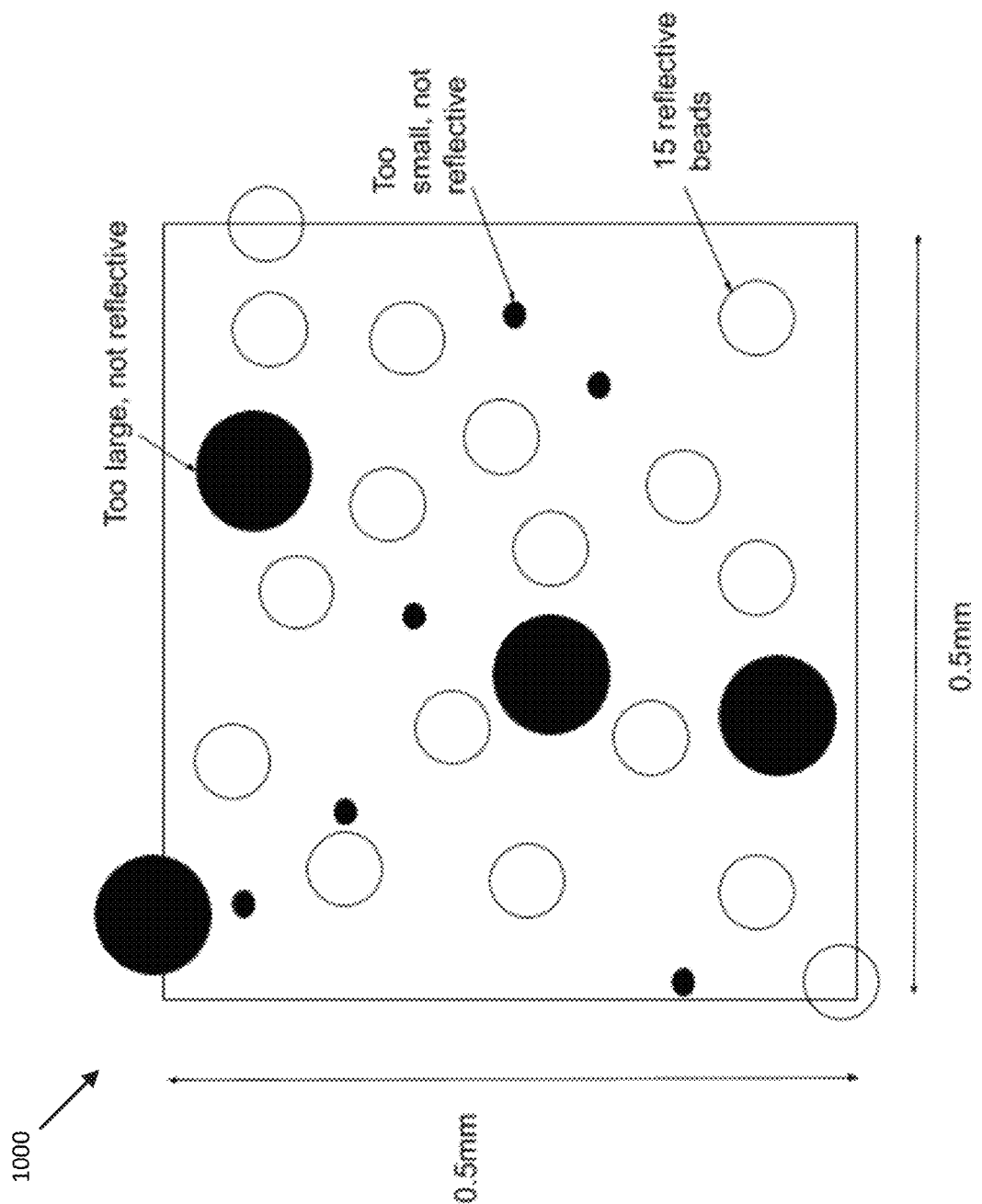
FIG. 10 illustrates a diagram of an example bead surface density in accordance with embodiments of the disclosure.

According to one or more embodiments, the glass beads may be impregnated into the uncured clear coat layer to provide a bead surface density of at least 15 partially exposed reflective glass beads per 0.5 mm by 0.5 mm square surface area of a cured clear coat layer. For example, beads that are too large (e.g., in diameter, or are not embedded to a sufficient depth) and/or beads that are too small (e.g., in diameter, or embedded beyond appropriate depth) may not provide an appropriate bead surface density. As shown in FIG. 10, although there may be more than 15 beads within a 0.5 mm by 0.5 mm square surface area of a clear coat layer, a bead surface density may be 15 reflective beads as beads that are too small or too large may not be reflective.

At block 416 of process 400, the impregnated uncured clear coat layer and the component are baked to cure the clear coat layer. For example, the component with the impregnated uncured clear coat layer may be heated in an enclosed oven for approximately 20 minutes at between 100-110 degrees Celsius. According various embodiments, separate furnaces may be used when heating the component to cure the powder coat layer and when heating the component to cure the clear coat layer.

At block 418 of process 400, the cured clear coat layer impregnated with glass beads may be inspected. For example, the component may be visually inspected and compared against inspection standards. In another example, the component's retroreflectivity may be measured during the inspection.

Although reference is made to glass beads herein, it will be understood that various other beads may be used to suit a desired application. Examples of beads may include aluminized or clear glass beads. The beads may be substantially spherical, however other shapes that provide different reflective characteristics are contemplated. For example, a combination of different shaped beads may provide a desired retroreflectivity. As another example, combinations of bead shapes may provide various reflective characteristics when light is emitted from sources disposed on the micro-mobility transit vehicle toward the combination of beads.

Figure 11:
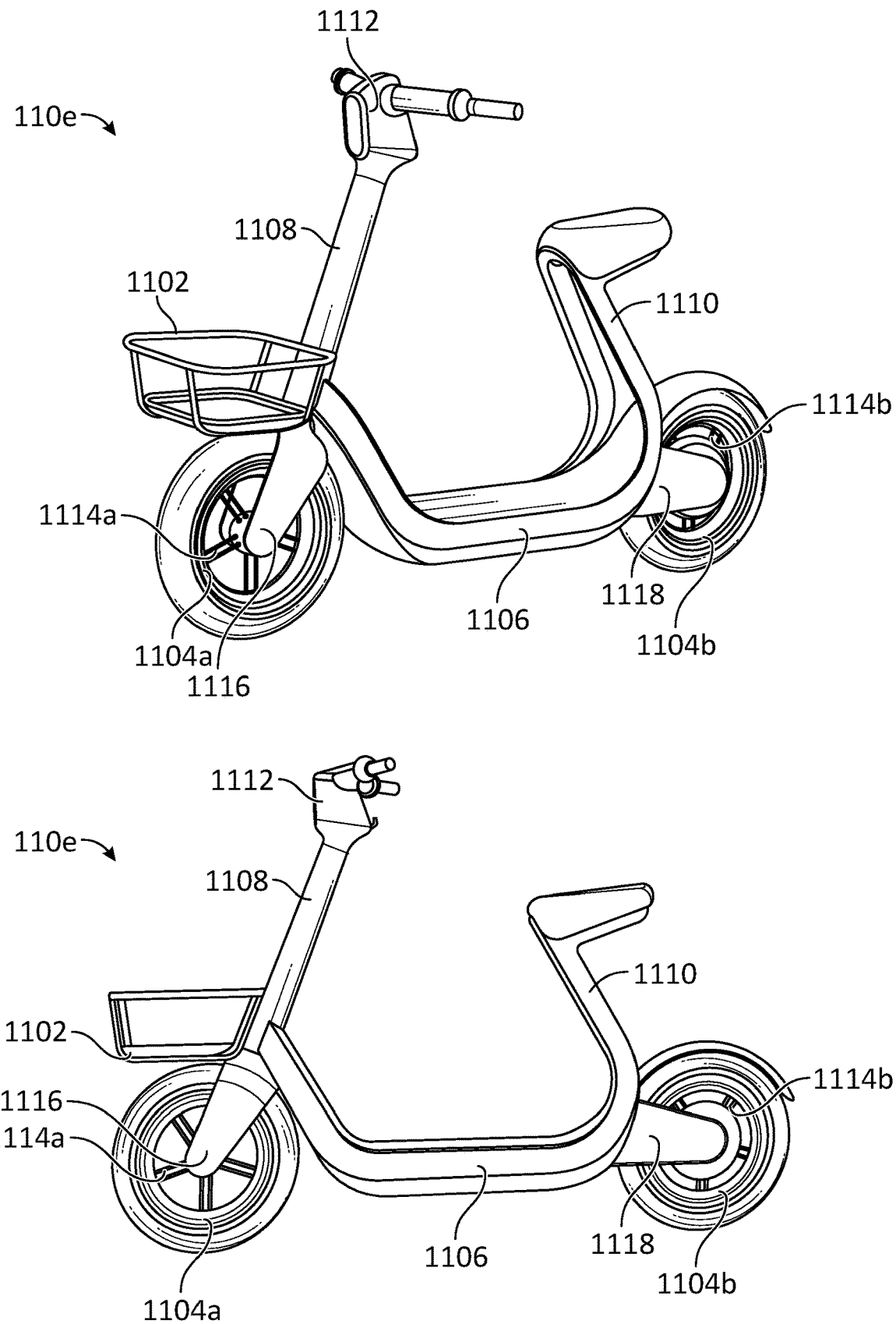
FIG. 11 illustrates diagrams of a micro-mobility transit vehicle having a retroreflective surface layer on various components in accordance with embodiments of the disclosure.

FIG. 11 illustrates views of an embodiment of transit vehicle 110e, which may correspond to a motorized sit-scooter that is integrated with the various elements of system 100 and may be configured to participate in dynamic transportation matching system 200 of FIG. 2. The process 400 described above may be implemented on various components of transit vehicle 110e to provide such components with a retroreflective surface layer. For example, user storage 1102 (e.g., implemented as a storage basket), wheel rims 1104a and 1104b, wheel spokes 1114a and 1114b, handle bars and cockpit assembly 1112, fork 1116, and/or frame 1106 may receive the retroreflective surface layer. In some embodiments, various individual components of the frame 1106 may be selected to receive the retroreflective surface layer. For example, head tube 1108, seat post 1110, and rear wheel stay 1118 may receive the retroreflective surface layer. Various components (and/or portions thereof) of transit vehicle 110e may be selected to provide a number of combinations of the components to receive the retroreflective surface layer.

In some embodiments, transit vehicle 110e (or 110c and 110g) may include various types of headlight assemblies, taillight assemblies, programmable light elements/strips/ spotlights, and/or reflective strips, as described herein, which may be integrated with retroreflective surface layers of various components of transit vehicle 110e to increase visibility, to provide ambient lighting, and/or to provide lighted beaconing, as described herein. For example, various shaped beads such as polygonal shaped beads may be embedded in the retroreflective surface layer and configured to reflect light from a light source, such as those above, in a direction away from the micro-mobility transit vehicle to provide greater visibility and an increased lighting effect for the micro-mobility transit vehicle. For example, glass spherical beads in the retroreflective surface layer may provide for retroreflective characteristics of the retroreflective surface layer to reflect light back toward external light sources while the polygonal aluminized or mirrored beads may provide reflective characteristics to reflect light away from light sources originating on the micro-mobility transit vehicle in a direction away from the micro-mobility transit vehicle. In this regard, the combination of glass spherical beads and other polygonal beads may provide for a surface layer that has several different reflective characteristics.

FIG. 12 illustrates views of an embodiment of transit vehicle 110c, which may correspond to a motorized bicycle that is integrated with the various elements of system 100 and may be configured to participate in dynamic transportation matching system 200 of FIG. 2. The process 400 described above may be implemented on various components of transit vehicle 110c to provide such components with a retroreflective surface layer. For example, user storage 1202 (e.g., implemented as a storage basket), wheel rims 1204a and 1204b, wheel spokes 1214a and 1214b, handle bars and cockpit assembly 1212, fork 1216, hub 1228, cranks 1222 (e.g, crank arms), foot pedals (e.g., foot pedal 1226), seat post clamp assembly 1224, and/or frame 1206 may receive the retroreflective surface layer. In some embodiments, various individual components of the frame 1206 may be selected to receive the retroreflective surface layer. For example, head tube 1208, seat post 1210, fenders (e.g., fender 1220), and rear wheel stay 1218 may receive the retroreflective surface layer. Various components (and/or portions thereof) of transit vehicle 110c may be selected to provide a number of combinations of components to receive the retroreflective surface layer. As an illustrative example, the fork 1216, the frame 1206 including the seat post 1210, and headtube 1208, and the cranks 1222 may receive the retroreflective surface layer for better discoverability and visibility at night.

In some embodiments, transit vehicle 110e may include various types of headlight assemblies, taillight assemblies, programmable light elements/strips/spotlights, and/or reflective strips, as described herein, which may be integrated with retroreflective surface layers of various components of transit vehicle 110e to increase visibility, to provide ambient lighting, and/or to provide lighted beaconing, as described herein.

Figure 13:
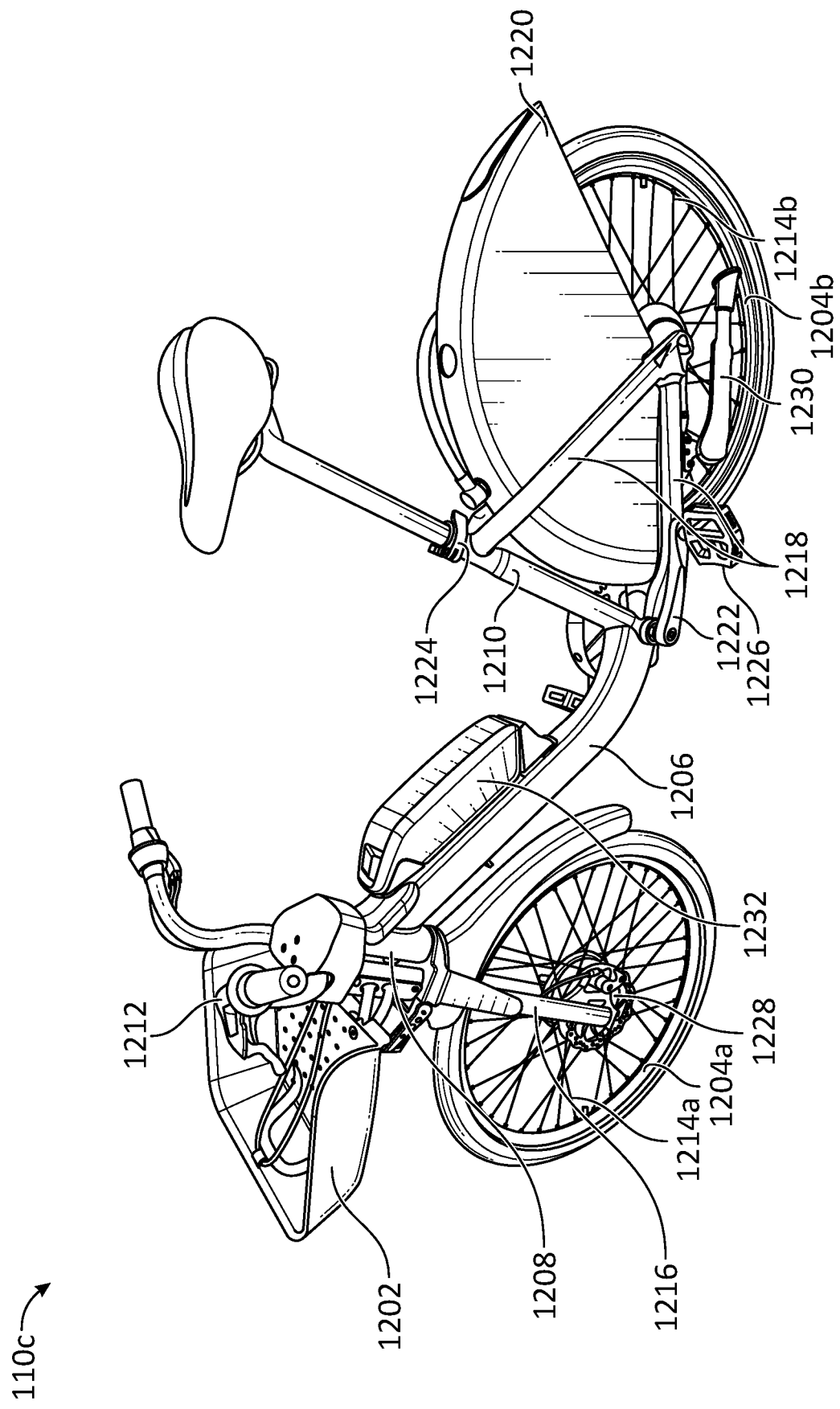
FIG. 13 illustrates a diagram of a micro-mobility transit vehicle having a retroreflective surface layer on various components in accordance with embodiments of the disclosure.

In the example embodiment shown in FIG. 13, transit vehicle 110c may further receive the retroreflective surface layer on a kickstand 1230 and/or battery assembly 1232.

Where applicable, various embodiments provided by the present disclosure can be implemented using hardware, software, or combinations of hardware and software. Also, where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method for forming a retroreflective surface layer over at least a portion of a component for a micro-mobility transit vehicle, the method comprising:
   forming an uncured clear coat layer over the portion of the component;
   after forming the uncured clear coat layer over the portion of the component, impregnating the uncured clear coat layer with a plurality of glass beads via an air-pressure applicator; and
   baking the impregnated uncured clear coat layer and the component to cure the clear coat layer and form the retroreflective surface layer, wherein the retroreflective surface layer comprises the cured clear coat layer and the plurality of glass beads distributed therein.

2. The method of claim 1, further comprising forming a cured powder coat layer over at least the portion of the component, prior to the forming the uncured clear coat layer, by:
   applying, via an electrostatic applicator, a powder coat powder to at least the portion of the component; and
   baking the powdered component to cure the powder coat powder and form a cured powder coat layer over at least the portion of the component;
   wherein the retroreflective surface layer comprises the cured clear coat layer, the plurality of glass beads distributed therein, and the cured powder coat layer underlying the cured clear coat layer.

3. The method of claim 2, wherein:
   the forming the uncured clear coat layer over the portion of the component comprises forming the uncured clear coat layer over the cured powder coat layer;
   the forming the uncured clear coat layer over the cured powder coat layer comprises applying, via a wet applicator, the uncured clear coat layer to the cured powder coat layer; and
   the uncured clear coat layer comprises an acrylic clear coat material configured to form a matte finish when cured.

4. The method of claim 1, wherein:
   a first thickness of the uncured clear coat layer is selected to form the cured clear coat layer at a second thickness of approximately between 25-50 microns.

5. The method of claim 1, wherein:
   the air-pressure applicator comprises a gravity fed glass bead reservoir and/or a siphon feed configured to supply the plurality of glass beads to an air jet ejected by the air-pressure applicator towards the portion of the component.

6. The method of claim 1, wherein:
   the air-pressure applicator comprises an ejection nozzle comprising an ejection orifice diameter of at least approximately 1 millimeter.

7. The method of claim 1, wherein:
   the air-pressure applicator is configured to receive air supplied at a pressure of approximately 45-60 pounds per square inch and generate an air jet configured to embed at least a portion of the plurality of glass beads approximately half their diameter within the uncured clear coat layer.

8. The method of claim 1, wherein:
   the baking the impregnated uncured clear coat layer and the component comprises heating the clear coated component in an enclosed oven for approximately 20 minutes at between 100-110 degrees Celsius.

9. The method of claim 1, wherein:
   the impregnating the uncured clear coat layer with the plurality of glass beads occurs within 5 minutes of the forming the uncured clear coat layer over the portion of the component.

10. The method of claim 1, wherein the impregnating the uncured clear coat layer with the plurality of glass beads comprises:
    embedding at least a portion of the plurality of glass beads within the uncured clear coat layer to a depth approximately between 0.5-0.65 times their diameter.

11. The method of claim 1, further comprising:
    assembling the micro-mobility transit vehicle by securing the component comprising the retroreflective surface layer to the micro-mobility transit vehicle.

12. The method of claim 1, wherein the plurality of glass beads comprises clear glass spherical beads and/or at least partially aluminized beads.

13. The method of claim 1, wherein each one of the plurality of glass beads comprises a diameter of approximately 30-50 microns.

14. The method of claim 1, wherein the glass beads are impregnated into the uncured clear coat layer to provide a bead surface density of at least 15 partially exposed glass beads per 0.5 mm by 0.5 mm square surface area of the cured clear coat layer.

15. The method of claim 1, further comprising:
    cleaning at least the portion of the component prior to the forming the uncured clear coat layer over the portion of the component; and masking at least a perimeter of the portion of the component to limit an extent of the retroreflective surface layer to the portion of the component, prior to the forming the uncured clear coat layer over the portion of the component.

16. The method of claim 1, wherein:
    the air-pressure applicator is oriented horizontally in performing the impregnating the uncured clear coat layer with the plurality of glass beads.

17. The method of claim 1, wherein:
    the component comprises a basket, a frame, a wheel, a front tube, a handlebar, a seat support, and/or a taillight assembly for the micro-mobility transit vehicle; and
    the micro-mobility transit vehicle comprises a sit-scooter, a stand-scooter, or a bicycle.

18. A micro-mobility transit vehicle comprising the component having the retroreflective surface layer formed according to the method of claim 1, wherein:
    the component is one of a basket, a frame, a wheel, a front tube, a handlebar, a seat support, or a taillight assembly; and the micro-mobility transit vehicle comprises a sit-scooter, a stand-scooter, or a bicycle.

19. The method of claim 1, wherein:
the air-pressure applicator is configured to generate an air jet configured to embed at least a portion of the plurality of glass beads approximately half their diameter within the uncured clear coat layer.

20. A component of a micro-mobility transit vehicle, wherein the component has a retroreflective surface layer comprising:
a cured powder coat layer formed over at least a portion of the component; and
a cured clear coat layer directly formed over the cured powder coat layer, wherein the cured clear coat layer directly formed over the cured powder coat layer comprises a plurality of glass beads embedded into the clear coat layer via an air-pressure applicator, the plurality of glass beads configured to reflect a first light emitted from a light source installed on the micro-mobility transit vehicle and a second light received from a light source external to the micro-mobility transit vehicle.

* * * * *